US012694375B2

(12) United States Patent
Ravi et al.

(10) Patent No.: US 12,694,375 B2
(45) Date of Patent: Jul. 28, 2026

(54) APPARATUSES, METHODS, AND COMPUTER PROGRAM PRODUCTS FOR ENERGY-CENTRIC PREDICTIVE MAINTENANCE SCHEDULING

(71) Applicant: Honeywell International Inc., Charlotte, NC (US)

(72) Inventors: Vijay Kumar Ravi, Atlanta, GA (US); Priya Hiteshkuma Ghetia, Gujarat (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 252 days.

(21) Appl. No.: 17/989,840

(22) Filed: Nov. 18, 2022

(65) Prior Publication Data

US 2024/0169325 A1     May 23, 2024

(51) Int. Cl.
| | |
|---|---|
| *G06Q 30/00* | (2023.01) |
| *G06Q 10/20* | (2023.01) |
| *G06Q 50/06* | (2012.01) |

(52) U.S. Cl.
CPC ............. *G06Q 10/20* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 5,873,251 A | * | 2/1999 | Iino | .......... F01K 13/02 |
| | | | | 60/660 |
| 11,526,139 B1 | * | 12/2022 | Baumgartner | ......... G05B 15/02 |
| 11,875,191 B1 | * | 1/2024 | Plenderleith | ........ H04W 64/003 |

(Continued)

OTHER PUBLICATIONS

Marinakis, Vangelis, et al. "From Big Data to Smart Energy Services: An Application for Intelligent Energy Management." Future Generation Computer Systems: vol. 110, pp. 572-586. (Year: 2018).*

(Continued)

*Primary Examiner* — Luis A Brown
(74) *Attorney, Agent, or Firm* — Seager, Tufte & Wickhem, LLP

(57) ABSTRACT

Methods, apparatuses, and computer program products for energy-centric predictive maintenance scheduling are provided. For example, a computer-implemented method may include inputting historical time-varying sensor state values associated with an asset into a data model to train the data model; inputting expected future time-varying asset-independent data over a time frame into the data model; generating from the data model predicted sensor state values and energy usage associated with the asset over the time frame; determining optimum energy usage by the asset over the time frame; calculating energy wastage over the time frame based on a difference between the predicted energy usage and the optimum energy usage; calculating, using the predicted sensor state values, one or more asset performance metrics corresponding to one or more preventive maintenance tasks; and generating and reporting one or more recommended service tasks over the time frame based at least in part on the calculated energy wastage.

17 Claims, 10 Drawing Sheets

(56) References Cited

U.S. PATENT DOCUMENTS

| | | | | |
|---|---|---|---|---|
| 2003/0061091 A1* | 3/2003 | Amaratunga | .... | G06Q 10/06375 705/7.31 |
| 2012/0323382 A1* | 12/2012 | Kamel | .................... | G06Q 50/06 700/286 |
| 2015/0198962 A1* | 7/2015 | Shiel | ....................... | G05B 15/02 700/291 |
| 2018/0150547 A1* | 5/2018 | Pallath | ................... | G06N 20/20 |
| 2018/0204116 A1* | 7/2018 | Evans | ..................... | G06N 3/045 |
| 2018/0341255 A1* | 11/2018 | Turney | .............. | G06Q 30/0206 |
| 2019/0271978 A1* | 9/2019 | ElBsat | .............. | G06Q 30/0282 |
| 2019/0325368 A1* | 10/2019 | Turney | ............ | G06Q 10/06315 |
| 2020/0096985 A1* | 3/2020 | Wenzel | ................ | G05B 13/047 |
| 2020/0274389 A1* | 8/2020 | Islam | ..................... | G06Q 50/06 |
| 2020/0301408 A1* | 9/2020 | Elbsat | ................. | G05B 23/024 |
| 2020/0356087 A1* | 11/2020 | Elbsat | ................ | G05B 23/0254 |
| 2021/0072742 A1* | 3/2021 | Wu | ......................... | G05B 15/02 |
| 2021/0123771 A1* | 4/2021 | Vega | ........................ | H04Q 9/00 |
| 2022/0067626 A1* | 3/2022 | Unnikrishnan | .. | G06Q 10/06375 |
| 2022/0083708 A1* | 3/2022 | Hertz-Shargel | ...... | G06N 3/0499 |
| 2022/0337058 A1* | 10/2022 | Kim | ........................ | H02J 3/003 |
| 2022/0344934 A1* | 10/2022 | Jayan | ..................... | G06Q 50/06 |
| 2023/0194281 A1* | 6/2023 | Lane | ...................... | G06Q 10/20 |
| 2023/0259117 A1* | 8/2023 | Manotas Gutierrez | ..................... | G05B 23/0283 700/28 |
| 2023/0418687 A1* | 12/2023 | Tantawi | ................ | G06F 9/5094 |
| 2023/0419106 A1* | 12/2023 | Mimaroglu | ........... | G06N 3/048 |

OTHER PUBLICATIONS

Marinakis, Vangelis, et al., "From Big Data to Smart Energy Services: An Application for Intelligent Energy Management." Future Generation Computer Systems: vol. 110, pp. 572-586, 2018. (Year: 2018).*
Tian, Zhigang, et al. "Condition Based Maintenance Optimization for Wind Power Generation Systems Under Continuous Monitoring." Renewable Energy vol. 36, pp. 1502-1509, 2010. (Year: 2010).*
Bryan Lim et al., "Temporal Fusion Transformers for Interpretable Multi-horizon Time Series Forecasting," 1-27, (Sep. 27, 2020). [Retrieved from the Internet May 18, 2023: URL: <https://arxiv.org/pdf/1912.09363.pdf>].
Salesforce, "About Models", retrieved from the Internet at URL: <https://help.salesforce.com/s/articleView?id=sf.bi_edd_model_about.htm&type=5> on May 18, 2023, 3 pages.

* cited by examiner

EVAPORATOR
- REFRIGERANT SATURATION TEMPERATURE AND PRESSURE
- COMPARED AGAINST THE SATURATION TEMP TARGET RANGE OF 5-12 AND PRESSURE RANGE OF 260-340

WATER FLOW
- COOLING AND CHILLED WATER FLOW PREDICTIONS
- BOTH CHARTS HAVE THE SAME Y AXIS RANGE FOR COMPARING COOLING AND CHILLED WATER FLOW RATES TO EACH OTHER

APPARATUSES, METHODS, AND COMPUTER PROGRAM PRODUCTS FOR ENERGY-CENTRIC PREDICTIVE MAINTENANCE SCHEDULING

TECHNOLOGICAL FIELD

Embodiments of the present disclosure generally relate to preventive maintenance scheduling of one or more asset(s) of a system, and specifically to generating and providing a preventive maintenance schedule for one or more asset(s) based on predicted sensor state values and predicted energy wastage associated with the one or more asset(s).

BACKGROUND

Assets of an operational system, for example sub-systems or individual assets, are often maintained on a regular schedule in attempts to keep the usable lifetime of the asset as long as possible without incurring downtime due to deterioration in operations of the asset. Applicant has discovered problems with current implementations of scheduling such preventive maintenance of asset(s). Through applied effort, ingenuity, and innovation, Applicant has solved many of these identified problems by developing embodied in the present disclosure, which are described in detail below.

BRIEF SUMMARY

In general, embodiments of the present disclosure provided herein provide improvements in scheduling preventive maintenance of asset(s). Other implementations for scheduling preventive maintenance of asset(s) will be, or will become, apparent to one with skill in the art upon examination of the following figures and detailed description. It is intended that all such additional implementations be included within this description be within the scope of the disclosure and be protected by the following claims.

In accordance with a first aspect of the disclosure, a method is provided. The method may be computer-executed via one or more computing devices embodied in hardware, software, firmware, and/or a combination thereof, as described herein. An example implementation of the method is performed at a device with one or more processors and one or more memories. The example method includes inputting historical time-varying sensor state values associated with an asset into a data model to train the data model. The example method further includes inputting expected future time-varying asset-independent data over a time frame into the data model. The example method further includes generating from the data model predicted sensor state values associated with the asset over the time frame. The example method further includes generating from the data model predicted energy usage by the asset over the time frame. The example method further includes determining optimum energy usage by the asset over the time frame. The example method further includes calculating energy wastage over the time frame based on a difference between the predicted energy usage and the optimum energy usage of the asset over the time frame. The example method further includes calculating, using the predicted sensor state values, one or more asset performance metrics corresponding to one or more preventive maintenance tasks. The example method further includes generating one or more recommended service tasks over the time frame based at least in part on the calculated energy wastage over the time frame. The example method further includes reporting the one or more recommended service tasks.

Additionally or alternatively, in some example embodiments of the method, the optimum energy usage by the asset over the time frame is determined based on historical energy usage by the asset.

Additionally or alternatively, in some example embodiments of the method, the optimum energy usage by the asset over the time frame is determined based on industry-standard data corresponding to a category of asset to which the asset belongs.

Additionally or alternatively, in some example embodiments of the method, the recommended service tasks are based at least in part on a date when the calculated energy wastage cumulatively equals a cost of the one or more recommended service tasks.

Additionally or alternatively, in some example embodiments of the method, the data model comprises a temporal fusion transformer deep learning model.

Additionally or alternatively, in some example embodiments of the method, the method further comprises inputting historical time-varying asset-independent data into the data model to train the data model.

Additionally or alternatively, in some example embodiments of the method, the future time-varying asset-independent data comprises at least forecasted weather and occupancy data.

In accordance with another aspect of the disclosure, an example system is provided. In at least one example embodiment, an example system includes at least one processor and at least one memory. The at least one memory has computer program code stored thereon that, in execution with the at least one processor, configures the system to perform any one of the example methods described herein. In yet another example embodiment, an example system includes means for performing each step of any one of the example methods described herein.

In accordance with yet another aspect of the disclosure, an example computer program product is provided. The example computer program product includes at least one non-transitory computer-readable storage medium having computer program code stored thereon that, in execution with at least one processor, configures the at least one processor to perform any one of the example methods described herein.

BRIEF DESCRIPTION OF THE DRAWINGS

Figure 1:
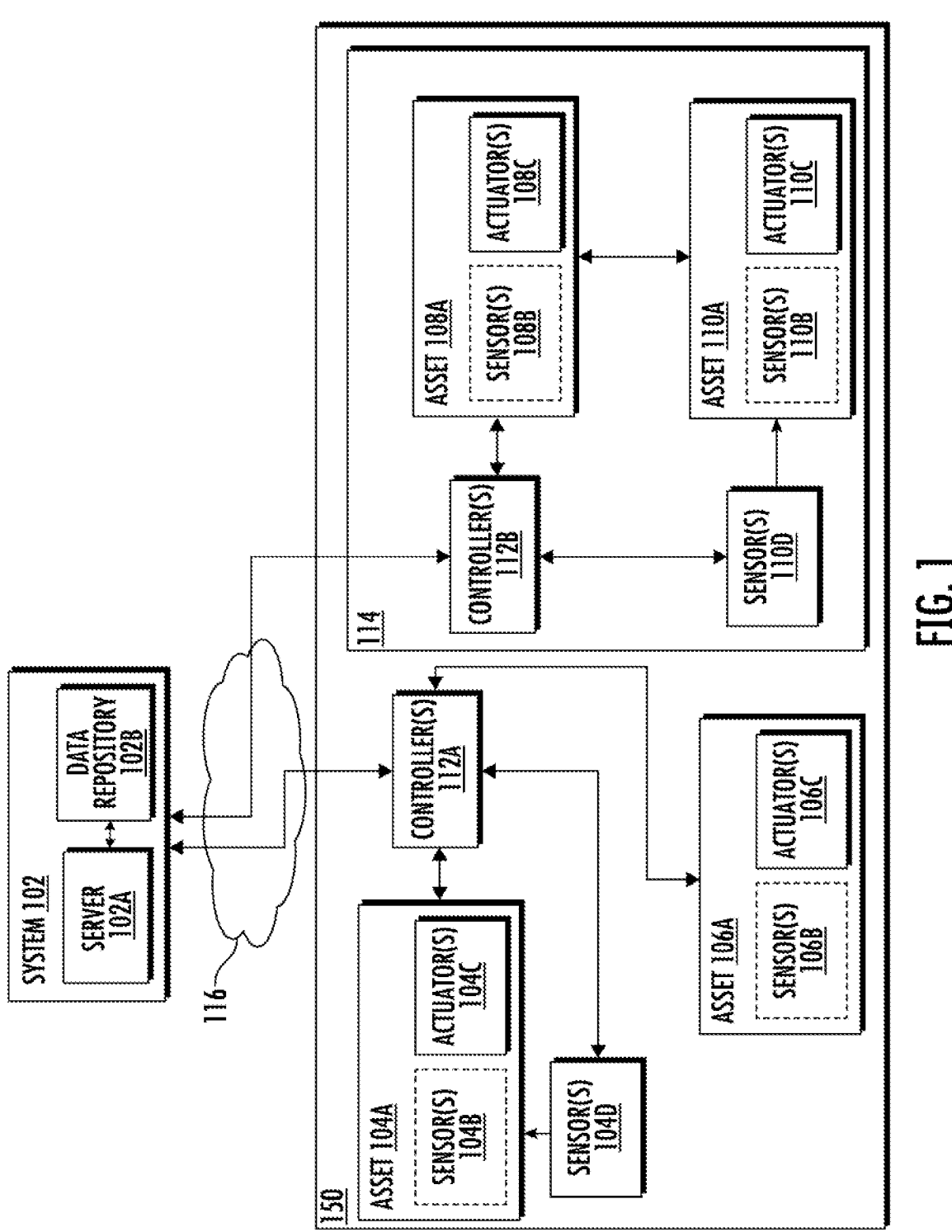
Figure 2:
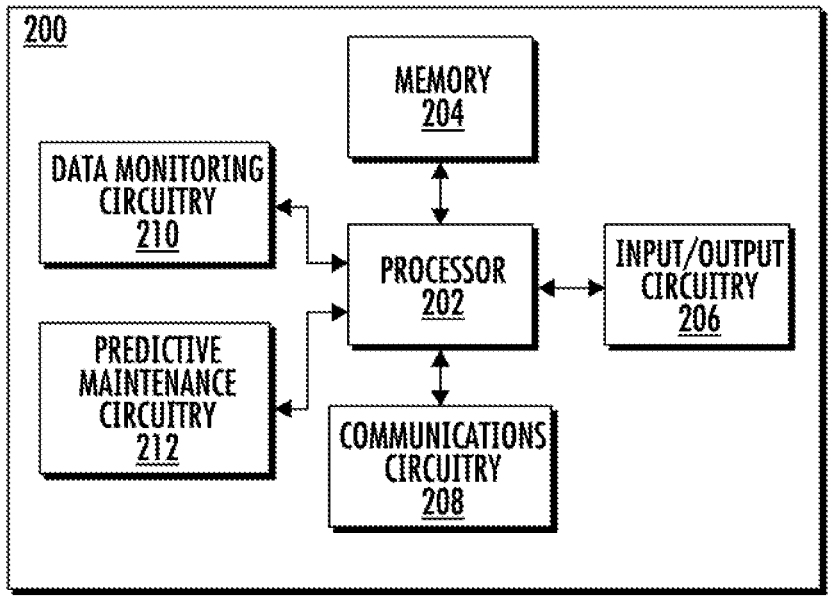
Figure 3:
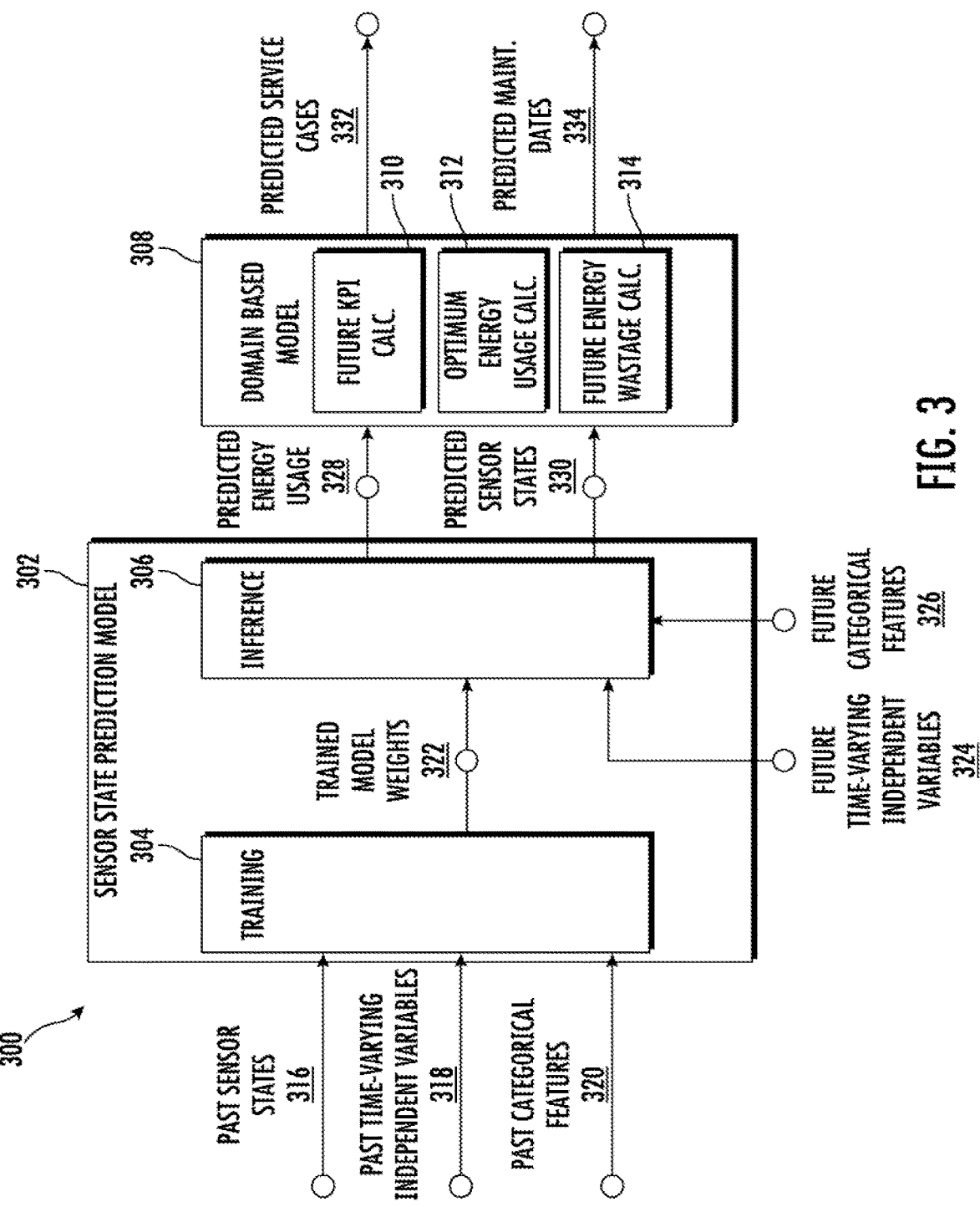
Figures 5A, 5B, 5C:
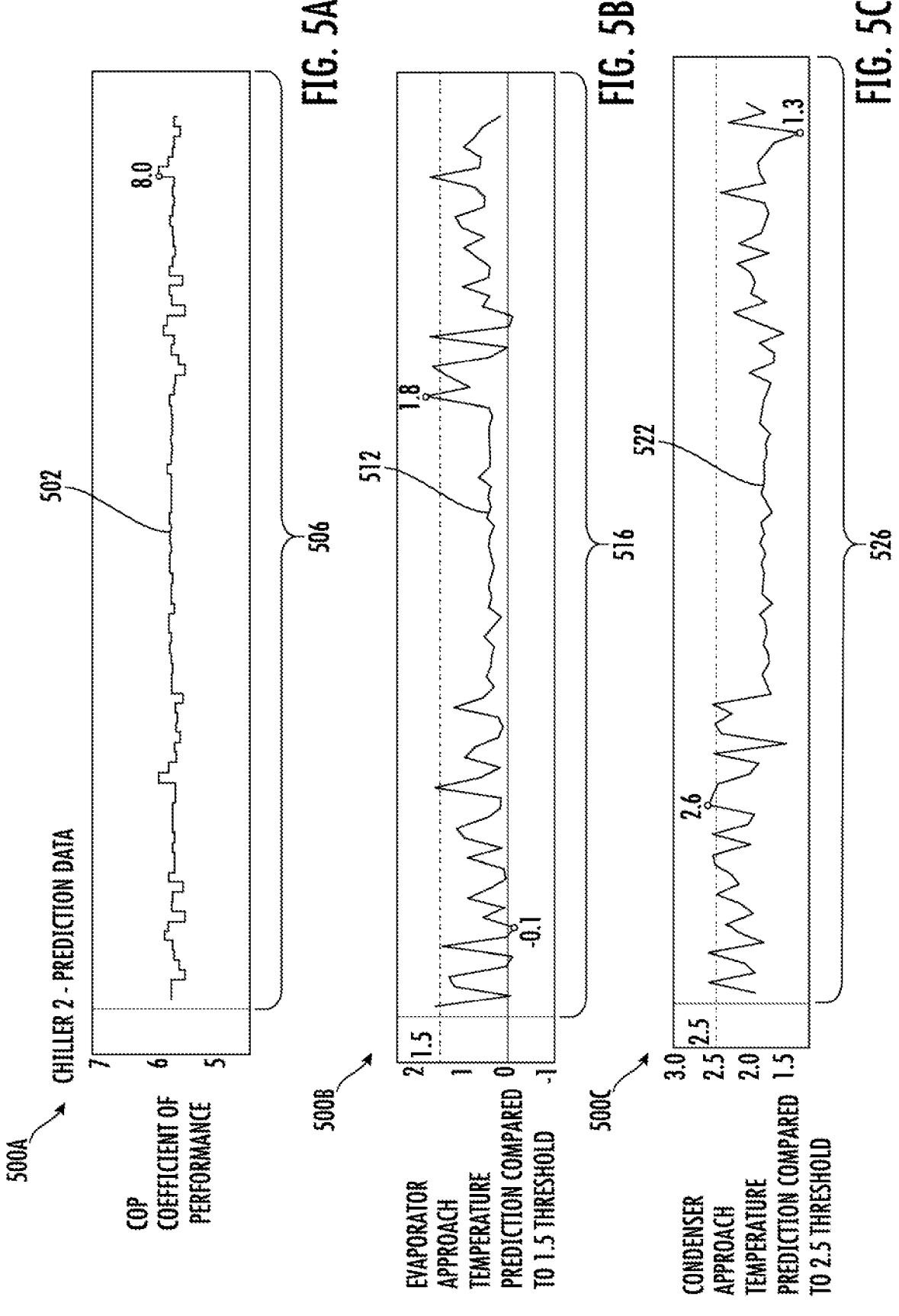
Figure 6:
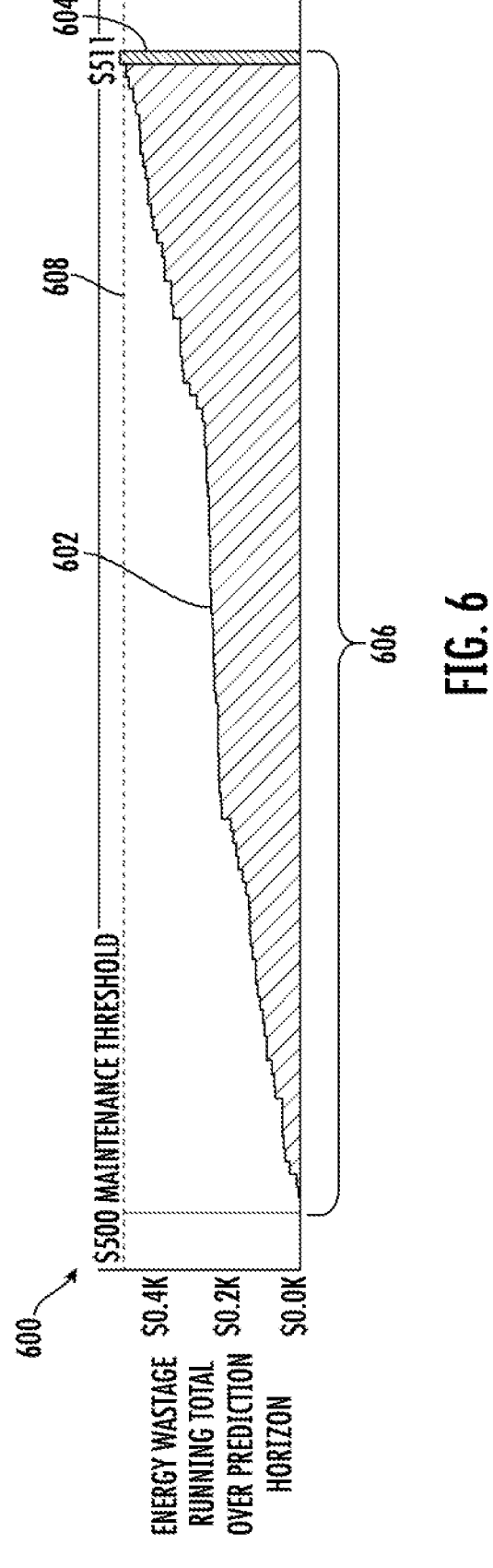
Figure 7A:
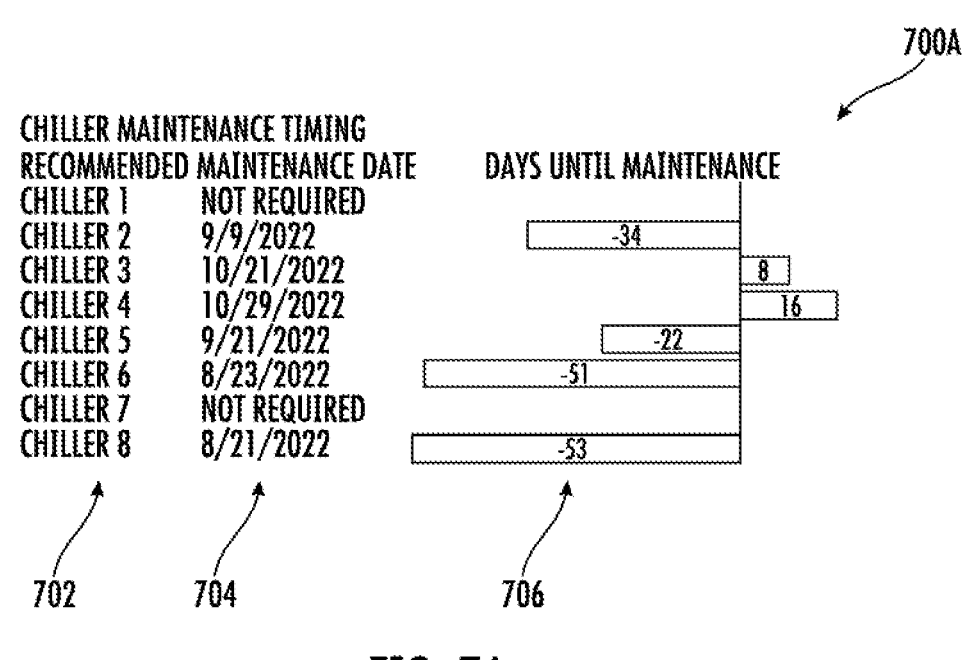
Figure 7B:
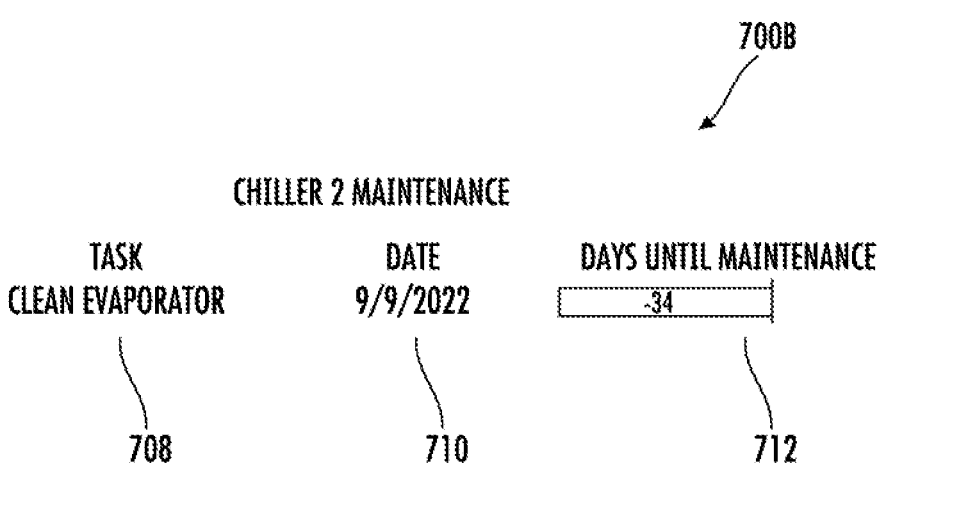
Figure 8:
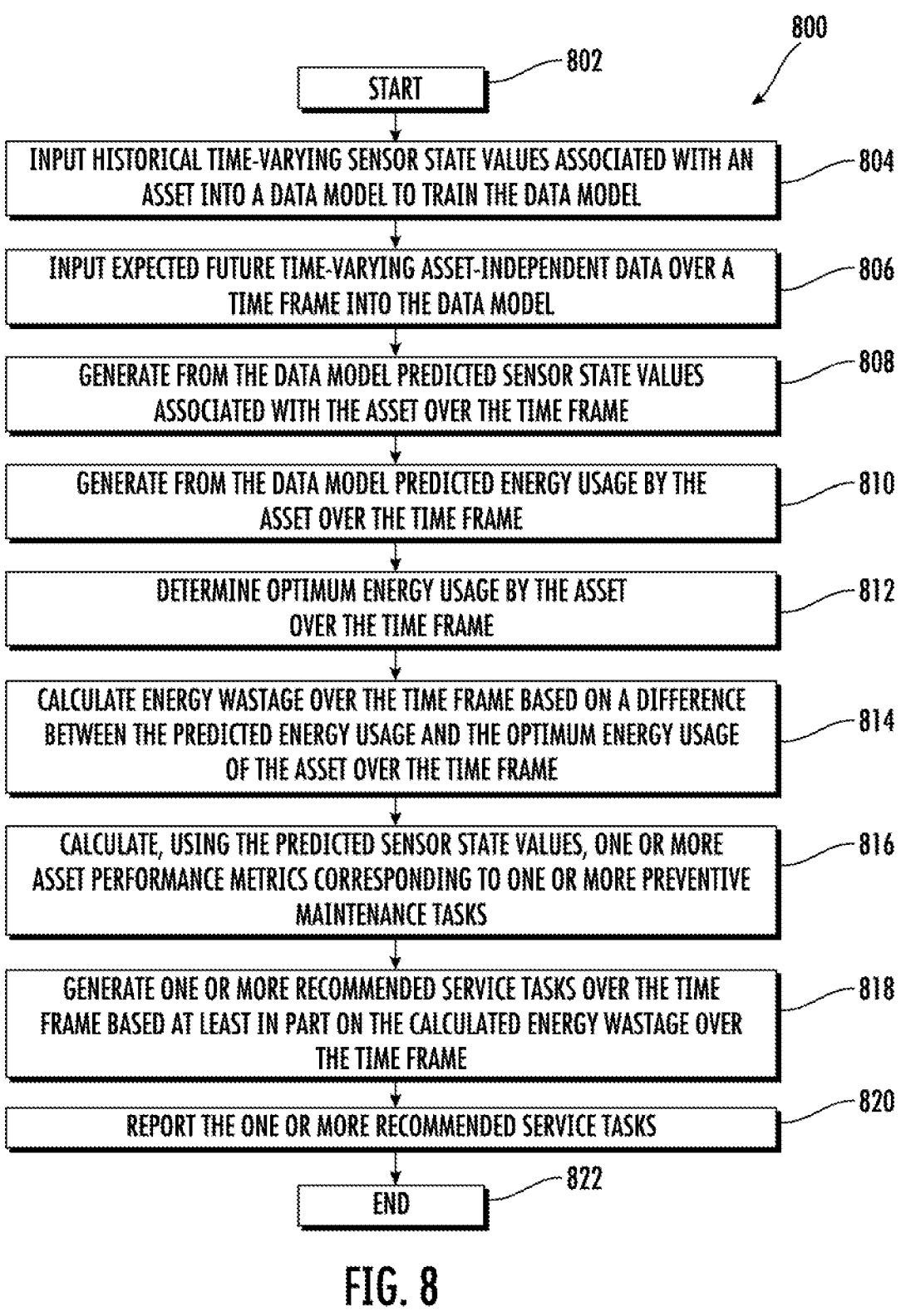

Having thus described the embodiments of the disclosure in general terms, reference now will be made to the accompanying drawings, which are not necessarily drawn to scale, and wherein:

FIG. 1 illustrates a block diagram of a system for predictive maintenance scheduling for one or more asset(s) that may be specially configured within which embodiments of the present disclosure may operate;

FIG. 2 illustrates a block diagram of an example predictive maintenance scheduling apparatus that may be specially configured in accordance with an example embodiment of the present disclosure;

FIG. 3 illustrates a visualization of an example computing environment for predictive maintenance scheduling using a model, in accordance with at least some example embodiments of the present disclosure;

FIGS. 4A-E illustrate an example user interface providing predicted sensor state values associated with an asset or system, in accordance with at least some example embodiments of the present disclosure;

FIGS. 5A-C illustrate another example user interface providing calculated key performance indicators associated with one or more predicted sensor state values for an asset or system, in accordance with at least some example embodiments of the present disclosure;

FIG. 6 illustrates another example user interface providing calculated energy wastage associated with one or more calculated key performance indicators and one or more predicted sensor state values for an asset or system, in accordance with at least some example embodiments of the present disclosure;

FIGS. 7A-B illustrate another example user interface providing preventive maintenance task recommendations and timing for an asset or system, in accordance with at least some example embodiments of the present disclosure; and FIG. 8 illustrates a flowchart including operational blocks of an example process for predictive maintenance scheduling, in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Systems engineers, owners, and operators (collectively "users") often attempt to track operational performance of a particular operational system, and/or asset(s) thereof, for any of a myriad of reasons. Among said reasons, such users often attempt to track operational performance of a particular asset (or plurality of assets) to determine when maintenance of such asset(s) is appropriate. For example, as an asset operates, the operation of the asset and/or changes in one or more circumstances associated with the operation of the asset may cause the asset's performance to begin to deteriorate, with such deterioration continuing until the asset deteriorates so much that it no longer can operate reliably for its intended purpose (e.g., the asset has no remaining useful lifetime). Maintenance of the one or more asset(s) may be performed to extend the lifetime of the asset(s), and/or otherwise to ensure that the operating conditions for the asset(s) remain in desired levels. Such maintenance is often termed "preventive maintenance," as the maintenance is performed not in response to a failure but rather to try to prevent a failure of the asset.

Users will often have a preventive maintenance plan, in which preventive maintenance is performed at routine intervals for particular asset(s). The maintenance may be scheduled according to industry standards based on the type of asset and/or recommendations by the asset manufacturer. By having a preventive maintenance plan, the users may initiate maintenance of asset(s) early enough such that the asset(s) do not break, malfunction, or otherwise cease performing as intended. An asset ceasing to perform as intended could cause downtime of the individual asset, or in worse instances could cause downtime of operations of an entire system or plant. Maintaining a consistent uptime, and ideally as high an uptime as possible, is desirable for all assets.

Such routine maintenance, however, faces problems and inefficiencies. For example, in a circumstance where routine maintenance is performed for an asset with a significant remaining useful lifetime, such maintenance could result in an unnecessary cost, unnecessary downtime, and/or the like. In circumstances where maintenance of a particular asset is expensive or difficult (e.g., because the asset is difficult to access, or particularly important with respect to operations of a particular system or plant) such unnecessary maintenance can be especially costly and/or time consuming, resulting in particularly detrimental downtime for the asset, system, and/or entire operational system of a plant, for example. Further, such preventive maintenance schedules may not take into consideration specific site conditions or other unique aspects of an asset. Additionally, such preventive maintenance schedules may not take into consideration energy usage, or, more specifically, energy wastage that may occur because an asset is not performing optimally due to the need to have preventive maintenance performed on the asset.

Embodiments of the present disclosure provide for scheduling preventive maintenance for one or more particular assets via the creation of future service cases where a user (such as a building owner) can schedule maintenance appointments in advance. This will help in reducing maintenance costs and reduce unplanned downtime of the assets. Embodiments of the present disclosure provide for prediction of the future need for preventive maintenance of an asset based on historical sensor state values from that asset, and will therefore be referred to herein as a predictive maintenance system and method. When recommending future service cases, some embodiments of the present disclosure take into consideration energy wastage that may occur because an asset is not performing optimally due to the need to have preventive maintenance performed.

In some embodiments of the present disclosure, historical time-varying sensor state values associated with one or more assets are input into a data model to train the data model. Along with the historical time-varying sensor state values, historical time-varying asset-independent data is also input into the data model to train the data model. In some embodiments, the data model comprises a temporal fusion transformer deep learning model. Once the data model is trained, expected future time-varying asset-independent data (e.g., forecasted weather and occupancy data) over a predefined future time frame (e.g., 90 days into the future) (which may be termed a prediction time frame) is input into the data model. The data model can then predict sensor state values associated with the asset(s) over the prediction time frame. The data model can also predict energy usage by the asset(s) over the prediction time frame.

Optimum energy usage by the asset(s) is determined over the prediction time frame. The optimum energy usage may be determined based on historical energy usage by the asset(s), may be determined based on industry-standard data corresponding to a category of asset(s) to which the asset(s) belongs, or may be determined by any other suitable method. Energy wastage over the prediction time frame may be calculated based on a difference between the predicted energy usage and the optimum energy usage of the asset(s) over the prediction time frame.

Using the predicted sensor state values, a domain based data model calculates one or more asset performance metrics corresponding to one or more preventive maintenance tasks. Based at least in part on the calculated performance metric (s) and at least in part on the calculated energy wastage over the time frame, one or more recommended service tasks over the time frame are generated. The recommended service task(s) may be based at least in part on a date when the calculated energy wastage cumulatively equals a cost of the recommended service task(s). The service task(s), which include a recommended date for the task(s) to be performed, is reported to the user(s).

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

FIG. 1 illustrates a block diagram of a system for predictive maintenance scheduling for one or more asset(s) that may be specially configured within which embodiments of the present disclosure may operate. Specifically, FIG. 1 depicts a predictive maintenance scheduling system 102 in communication with an operational system 150. In some embodiments, the monitoring system 102 is configured to communicate with each of the depicted computing devices, for example the various assets, systems, and/or associated sensors directly or indirectly through direct communication with another device (e.g., a controller). In other embodiments, for example as depicted, the predictive maintenance scheduling system 102 is configured to communicate with one or more computing devices over the communications network 116.

The communications network 116 may embody any of a myriad of network(s) configured to enable communication between two or more computing device(s). In some embodiments, the communications network 116 embodies a private network. For example, the predictive maintenance scheduling system 102 may be embodied by various computing device(s) on an internal network, such as one or more server(s) of an industrial plant in communication with the various controller(s), asset(s), and/or sensor(s) associated with operating the industrial plant. In some such embodiments, the predictive maintenance scheduling system 102 is embodied by computing device(s) proximally located to the industrial plant and/or other computing devices to be monitored, for example within the same plant site or other physical, defined location.

In other embodiments, the communications network 116 embodies a public network, for example the Internet. In some such embodiments, the predictive maintenance scheduling system 102 may embody a remote or "cloud" system that accesses the computing devices of the operational system 150 over the communications network 116 from a location separate from the physical location of the operational system 150. For example, the predictive maintenance scheduling system 102 may be embodied by computing device(s) of a central headquarters, server farm, distributed platform, and/or the like. In some such embodiments, the predictive maintenance scheduling system 102 may be accessed directly (e.g., via a display and/or peripherals operatively engaged with the predictive maintenance scheduling system 102), and/or may be accessed indirectly through use of a client device. For example, in some embodiments, a user may login (e.g., utilizing a username and password) or otherwise access the predictive maintenance scheduling system 102 to access the described functionality with respect to one or more particular operational system(s), plant location(s), and/or the like. Alternatively or additionally, in some embodiments, the predictive maintenance scheduling system 102 is particularly associated with the operational system 150 to provide access specifically to the described functionality with respect to the operational system 150, for example without requiring additional user authentication.

The predictive maintenance scheduling system 102 comprises one or more computing devices embodied in hardware, software, firmware, and/or the like, that provide the predictive maintenance scheduling functionality desired herein. As depicted, the monitoring system includes a server 102A and a data repository 102B that may each be embodied by one or more computing devices communicable with one another to provide the functionality described herein.

The server 102A may include one or more computing devices embodied in hardware, software, firmware, and/or the like, configured to intake and/or process data to provide the described functionality. In some embodiments, the server 102A receives sensor data from or otherwise associated with one or more assets the operational system 150. For example, in some embodiments, the server 102A communicates over the communications network 116 to receive or otherwise collect sensor data from sensor(s) associated with each asset. Alternatively or additionally, in some embodiments, the server 102A communicates over the communications network 116 directly with one or more asset(s) and/or associated controller(s) to receive sensor data embodying configurations and/or other data values associated with data properties of the asset(s). Additionally or alternatively still, in some embodiments, the server 102A is configured to process sensor data to provide various functionality. For example, in some embodiments, the server 102A processes the historical sensor data associated with a particular asset to train a data model and use the data model to predict future sensor state values for the asset. In some such embodiments, the server 102A is configured to use the predicted future sensor state values for the asset to calculate performance metric(s) for the asset. In some such embodiments, the server 102A is configured to, based at least in part on the calculated performance metric(s) and at least in part on the calculated energy wastage over the time frame, generate one or more recommended service tasks over the time frame.

The data repository 102B may include one or more computing devices embodied in hardware, software, firmware, and/or the like, configured to store and/or otherwise maintain data associated with predictive maintenance scheduling functionality. In some embodiments, the data repository 102B stores sensor data associated with one or more asset(s) of one or more operational systems. Additionally or alternatively, in some embodiments, the data repository 102B stores values for one or more historical sensor state values, one or more historical time-varying independent variables, and/or one or more historical categorical features associated with a particular asset and/or corresponding metadata (e.g., timestamp information embodying when the value was collected or generated, and/or the like). Alternatively or additionally still, in some embodiments, the data repository 102B stores derived data associated with a particular asset, for example predicted energy usage and predicted sensor state values, and/or corresponding metadata (e.g., timestamp information embodying when the value was collected or generated, and/or the like).

In some embodiments, for example, the data repository 102B may be embodied by one or more database servers, memory devices, and/or the like, configured for storing such sensor data. In some embodiments, the data repository 102B includes one or more remote or "cloud" databases accessible over one or more networks, such as the communications network 116 or a separate communications network (e.g., the Internet).

The operational system 150 includes a plurality of sub-systems and assets that provide particular functionality, for example functionality associated with operations of a particular industrial plant. As illustrated, the operational system 150 includes assets 104A, 106A, 108A, and 110A. The operational system 150 further includes various sensors associated with the various assets, including sensors separate or otherwise external from the individual assets such as sensor(s) 104D and sensor(s) 110D. In some embodiments, the various sensors further embody assets for which data is collected and/or processed by the predictive maintenance scheduling system 102. The operational system 150 further includes system 114 that embodies a sub-system of the operational system 150 and includes a plurality of associated computing devices that operate in conjunction to perform particular functionality. In some embodiments, the sub-system 114 further embodies assets for which data is collected and/or processed by the predictive maintenance scheduling system 102.

The operational system 150 further includes controller(s) 112A and controller(s) 112B communicable with various other assets of the operational system 150. In some embodiments, the controller(s) 112A and/or controller(s) 112B each embody assets for which data is collected and/or processed by the predictive maintenance scheduling system 102. Each controller may be embodied by one or more computing devices embodied in hardware, software, firmware, and/or the like, that provides activation and/or other input signals to each of the assets. Non-limiting examples of such controllers include programmable logic controllers, proportional controllers, derivative controllers, and the like. Each controller may be configured to activate and/or otherwise initiate operation of one or more asset(s) communicable with or otherwise configured to be controlled by the controller. For example, as illustrated, controller(s) 112A control each of the assets 104A and 106A, as well as the external sensors 104D associated with the asset 104A. Controller(s) 112B control each of the assets of the sub-system 114, specifically assets 108A and 110A together with external sensors 110D corresponding to asset 110A.

Each of the assets 104A, 106A, 108A, and 110A may embody various components that operate to provide particular functionality. In an example context, each of the assets embodies a computing device of one or more systems for operation of a residential building (e.g., HVAC (heating, ventilation, and air conditioning) assets, security assets, and/or the like). In another example context, each of the assets embodies a computing device of one or more systems for operation of a manufacturing plant (e.g., HVAC assets, manufacturing machinery, conveyor belts, and/or the like). The system 114 may include a plurality of sub-assets that operate and/or are controlled together, are housed together, or otherwise operate in conjunction with one another as part of a larger sub-system.

Each of the assets 104A, 106A, 108A, and 110A may include one or more actuator(s) 104C, 106C, 108C, and 110C. The actuator(s) 104C, 106C, 108C, and 110C may each be activated to operate each of the corresponding assets. For example, the actuator(s) 104C may be activated and/or otherwise manipulated to operate the asset 104A. Similarly, the actuator(s) 108C may be activated and/or otherwise manipulated to operate the asset 108A. In this regard, each of the assets 104A, 106A, 108A, and 110A may be activated via the corresponding actuator(s) to accomplish one or more operations performed by the asset.

Each of the assets 104A, 106A, 108A, and 110A optionally may include or otherwise are associated with one or more internal sensor(s), for example embodied by the sensor(s) 104B, 106B, 108B, and/or 110B. Each of the sensor(s) 104B, 106B, 108B, and/or 110B may monitor one or more aspects of the operational health of the corresponding asset 104A, 104A, 106A, or 110A, respectively. For example, such sensor(s) may include a temperature sensor, a pressure sensor, a flow sensor, and/or the like. Each of the sensor(s) for a particular asset may monitor the value of one or more particular data properties associated with operation of the corresponding asset. Data values from the sensor(s) may be collected continuously, at set or predefined time intervals (e.g., every minute, every 5 minutes, hourly, and/or the like). In this regard, the sensor(s) may be utilized to collect values associated with the corresponding asset in real-time at one or more desired times.

One or more assets may optionally be associated with one or more sensors external to the asset itself. For example, as depicted, sensor(s) 110D are associated with asset 110A such that the sensor(s) 110D monitor one or more aspects of the operational health of asset 110A. Similarly, as depicted, the sensor(s) 104D are associated with asset 104A such that the sensor(s) 104D monitor one or more aspects of the operational health of asset 104A. The external sensor(s) may each monitor one or more aspects of the corresponding asset itself, or of the environment surrounding or otherwise associated with the asset. For example, the sensor(s) 104D may monitor the temperature environment of the asset 104A, or may monitor the humidity in the environment of the asset 104A. In this regard, such external sensor(s) may provide sensor data embodying such values corresponding to data properties monitored by the sensor(s). The sensor data embodying such values may be provided to the predictive maintenance scheduling system 102 for storing and/or further processing as described herein.

In some embodiments, one or more assets is associated with at least one upstream or downstream asset. For example, a particular asset may be associated with at least one upstream asset whose operational health impacts the particular asset. Alternatively or additionally, a particular asset may be associated with at least one downstream asset, such that the operational health of the particular asset impacts the operational health of the downstream asset. It should be appreciated that a particular asset may be tagged with one or more data values that indicate associations between assets, for example which assets are upstream or downstream assets from one another. In some embodiments, one or more assets of a system are upstream and/or downstream with respect to one another, for example in circumstances where assets of a system operate in a particularly defined order to provide particular functionality. In some embodiments, the upstream asset controls and/or otherwise activates the downstream asset.

As illustrated, for example, asset 110A embodies a downstream asset with respect to asset 108A. Similarly, asset 108A represents an upstream asset with respect to asset 110A. In this regard, operational deficiencies or failure of the asset 108A may affect the operational health of the asset 110A. For example, in some embodiments, the asset 108A activates or otherwise controls the asset 110A, such that operational deficiencies of the asset 108A similarly cause control of the asset 110A to become deficient. In other embodiments, the controller(s) 112B independently controls the asset 108A in addition to the asset 110A.

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In at least one example embodiment, the predictive maintenance scheduling system 102 is embodied by one or more computing systems, such as the predictive maintenance scheduling apparatus 200 as shown in FIG. 2. The predictive maintenance scheduling apparatus 200, as depicted, includes a processor 202, memory 204, input/output circuitry 206, communications circuitry 208, data monitoring circuitry 210, and predictive maintenance circuitry 212. Although the components are described with respect to functional limitations, it should be understood that the particular implementations necessarily include the use of particular hardware. It should also be understood that certain of the components described herein in some embodiments include similar or common hardware. For example, in some embodiments two sets of circuitry both leverage use of the same processor, network interface, storage medium, or the like to perform their associated functions, such that duplicate hardware is not required for each set of circuitry. The use of the term "circuitry" as used herein with respect to components of the predictive maintenance scheduling apparatus 200 should therefore be understood to include particular hardware configured to perform the functions associated with the particular set of circuitry as described herein.

Additionally or alternatively, the term "circuitry" should be understood broadly to include hardware and, in some embodiments, software and/or firmware for configuring the hardware. For example, in some embodiments, "circuitry" refers to and/or includes processing circuitry, storage media, network interfaces, input/output devices, and the like. In some embodiments, other elements of the predictive maintenance scheduling apparatus 200 provide or supplement the functionality of the particular circuitry. For example, in some embodiments the processor 202 provide processing functionality, the memory 204 provides storage functionality, the communications circuitry 208 provides network interface functionality, and the like, to one or more of the other sets of circuitry.

In some embodiments, the processor 202 (and/or co-processor or any other processing circuitry assisting or otherwise associated with the processor) is in communication with the memory 204 via a bus for passing information among components of the apparatus. The memory 204 is non-transitory and in some embodiments includes, for example, one or more volatile and/or non-volatile memories. In other words, for example in some embodiments, the memory embodies a non-transitory electronic storage device (e.g., a computer readable storage medium). In some embodiments, the memory 204 is configured to store information, data, content, applications, instructions, or the like, for enabling the predictive maintenance scheduling apparatus 200 to carry out various functions in accordance with example embodiments of the present disclosure. In some embodiments, for example, the memory 204 embodies one or more databases for storing user data objects, electronic data objects, and/or other data associated therewith, and/or otherwise is configured to maintain such data objects for accessing and/or updating as described herein.

In various embodiments of the present disclosure, the processor 202 is embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multi-threading. The use of the terms "processor," "processing module," and "processing circuitry" may be understood to include a single-core processor, a multi-core processor, multiple processors internal to the apparatus, other central processing unit ("CPU"), microprocessor, integrated circuit, and/or remote or "cloud" processors.

In an example embodiment, the processor 202 is configured to execute computer-coded instructions stored in the memory 204 or otherwise accessible to the processor. Alternatively, or additionally, in some embodiments, the processor 202 is configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively or additionally, in another example context, when the processor is embodied as an executor of software instructions, the instructions specifically configure the processor 202 to perform the algorithms and/or operations described herein when the instructions are executed.

As one example context, the processor 202 is configured to support predictive maintenance scheduling functionality. In some such embodiments, for example, the processor 202 is configured to input historical time-varying sensor state values associated with an asset into a data model to train the data model. Additionally or alternatively, in some embodiments, the processor 202 is configured to input expected future time-varying asset-independent data over a prediction time frame into the data model. Additionally or alternatively, in some embodiments, the processor 202 is configured to generate from the data model predicted sensor state values associated with the asset over the prediction time frame. Additionally or alternatively, in some embodiments, the processor 202 is configured to generate from the data model predicted energy usage by the asset over the prediction time frame. Additionally or alternatively, in some embodiments, the processor 202 is configured to determine optimum energy usage by the asset over the prediction time frame. Additionally or alternatively, in some embodiments, the processor 202 is configured to calculate energy wastage over the prediction time frame based on a difference between the predicted energy usage and the optimum energy usage of the asset over the prediction time frame. Additionally or alternatively, in some embodiments, the processor 202 is configured to calculate, using the predicted sensor state values, one or more asset performance metrics corresponding to one or more preventive maintenance tasks over the prediction time frame. Additionally or alternatively, in some embodiments, the processor 202 is configured to generate one or more recommended service tasks, including recommended timing (i.e., recommended date the service task is to be performed), over the prediction time frame based at least in part on the one or more calculated performance metrics and at least in part on the calculated energy wastage over the time frame. Additionally or alternatively, in some embodiments, the processor 202 is configured to report the one or more recommended service tasks/timing.

In some embodiments, the predictive maintenance scheduling apparatus 200 includes input/output circuitry 206 that, alone or in communication with processor 202, provides output to the user and/or receives indication(s) of user input. In some embodiments, the input/output circuitry 206 comprises one or more user interfaces, and/or includes a display to which user interface(s) may be rendered. In some embodiments, the input/output circuitry 206 comprises a web user interface, a mobile application, a desktop application, a linked or networked client device, and/or the like. In some embodiments, the input/output circuitry 206 also includes any of a number of peripherals, a keyboard, a mouse, a joystick, a touch screen, touch areas, soft keys, a microphone, a speaker, or other input/output mechanisms. In some such embodiments, the input/output mechanisms are configured to enable a user to provide data representing one or more user interaction(s) for processing by the predictive maintenance scheduling apparatus 200. The processor 202 and/or input/output circuitry 206 communicable with the processor 202, is configured to control one or more functions of one or more user interface elements through computer program instructions (e.g., software and/or firmware) stored on a memory accessible to the processor (e.g., memory 204, and/or the like).

In some embodiments, the predictive maintenance scheduling apparatus 200 includes communications circuitry 208. The communications circuitry 208 is embodied by any means such as a device or circuitry embodied in either hardware or a combination of hardware and software that is configured to receive and/or transmit data from/to a network and/or any other device, circuitry, or other module in communication with the predictive maintenance scheduling apparatus 200. In this regard, the communications circuitry 208 includes, in some embodiments for example, at least a network interface for enabling communications with a wired or wireless communications network. For example, in some embodiments, the communications circuitry 208 includes one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

In some embodiments, the predictive maintenance scheduling apparatus 200 includes data monitoring circuitry 210. The data monitoring circuitry 210 includes hardware, software, firmware, and/or a combination thereof, configured to support data gathering and storing functionality associated with predictive maintenance scheduling functionality of the predictive maintenance scheduling system 102. The data monitoring circuitry 210, in some embodiments, utilizes processing circuitry such as the processor 202 to perform one or more of these actions. Additionally or alternatively, the data monitoring circuitry 210, in some embodiments, utilizes one or more portions of communications circuitry, such as some or all of the communications circuitry 208, to communicate with one or more other computing devices and/or receive data from such computing devices.

In some embodiments, the data monitoring circuitry 210 is configured to receive sensor data. The data monitoring circuitry 210 may receive sensor data from one or more sensor(s) associated with one or more asset(s), from controller(s) associated with one or more asset(s), from the asset(s) directly, and/or the like. In some embodiments, the data monitoring circuitry 210 includes hardware, software, firmware, and/or a combination thereof to request and/or receive such sensor data, for example in real time. Additionally or alternatively, in some embodiments the data monitoring circuitry 210 includes hardware, software, firmware, and/or a combination thereof, to automatically receive sensor data, for example in real time at particular timestamp intervals (e.g., every minute, every 5 minutes, every hour, and/or the like) or continuously. Additionally or alternatively, in some embodiments, the data monitoring circuitry 210 includes hardware, software, firmware, and/or a combination thereof, to store and/or maintain the sensor data and/or data derived therefrom in one or more repositories. In some embodiments, for example, the data monitoring circuitry 210 includes software, hardware, firmware, and/or a combination thereof, to store sensor data as received in a first data repository for storing such data maintained on or otherwise accessible to the predictive maintenance scheduling apparatus 200, and/or predicted sensor state values and predicted energy usage associated with particular asset(s) in a second data repository for storing such derived data maintained on or otherwise accessible to the predictive maintenance scheduling apparatus 200. It should be appreciated that, in some embodiments, the data monitoring circuitry 210 includes or is embodied by a separate processor, specially configured field programmable gate array (FPGA), and/or a specially configured application-specific integrated circuit (ASIC).

The predictive maintenance circuitry 212 includes hardware, software, firmware, and/or a combination thereof, configured to support perform one or more of the following actions associated with the predictive maintenance scheduling system 102: inputting historical time-varying sensor state values associated with an asset into a data model to train the data model; inputting expected future time-varying asset-independent data over a time frame into the data model; generating from the data model predicted sensor state values associated with the asset over the time frame; generating from the data model predicted energy usage by the asset over the time frame; determining optimum energy usage by the asset over the time frame; calculating energy wastage over the time frame based on a difference between the predicted energy usage and the optimum energy usage of the asset over the time frame; calculating, using the predicted sensor state values, one or more asset performance metrics corresponding to one or more preventive maintenance tasks; generating one or more recommended service tasks over the time frame based at least in part on the one or more calculated performance metrics and at least in part on the calculated energy wastage over the time frame; and reporting the one or more recommended service tasks.

In some embodiments, the predictive maintenance circuitry 212 includes or is embodied by a separate processor, specially configured field programmable gate array (FPGA), and/or a specially configured application-specific integrated circuit (ASIC). In some embodiments, one or more of the aforementioned sets of circuitry are combined to form a single set of circuitry. The single combined set of circuitry may be configured to perform some or all of the functionality described herein with respect to the individual sets of circuitry. For example, in at least one embodiment, the data monitoring circuitry 210 and the predictive maintenance circuitry 212 are embodied by a single set of circuitry, and/or one or more of the data monitoring circuitry 210 and/or the predictive maintenance circuitry 212 are combined with the processor 202. Additionally or alternatively, in some embodiments, one or more of the sets of circuitry described herein is/are configured to perform one or more of the actions described with respect to one or more of the other sets of circuitry.

Various embodiments of the present disclosure can be used for predictive maintenance scheduling for many different types of assets. Some portions of various embodiments of the present disclosure are agnostic as to the type of asset. That is, some portions of various embodiments of the present disclosure may be used with any type of asset. As described above, each of the assets may embody various components that operate to provide particular functionality. In an example context, the assets may comprise components of an HVAC system, including but not limited to chillers, air handling units, heat exchangers, cooling towers, boilers, heaters, fans, pumps, motors, variable air volume systems, and the like. An example embodiment will be described herein in relation to predictive maintenance scheduling for a chiller. Chillers are components of some HVAC systems and transfer heat away from a space that requires climate control much like a traditional air conditioning unit does, but chillers use water (or a water solution) to do so instead of air. Chillers are often used to cool large buildings.

A condenser is an integral part of a chiller and is where the refrigerant is cooled down through the use of cooling water. The heat transfer happens between where the refrigerant is cooled down from a higher state (gaseous state) to a lower state (liquid) which is then fed into the evaporator. The cooling water that picks up the heat then is sent to a cooling tower to cool the water down and then the cooling water is circulated back into the condenser. Since this cooling water goes to the cooling tower which is typically in outside environment (e.g., on a roof top), there are often impurities in the cooling water loop that gets sent over to the condenser. Due to these external factors, scaling happens in the condenser and this scaling causes condenser fouling. Fouling is the process where the heat transfer capability of the condenser is reduced due to the insulating layers that were built up due to scaling. Subsequently, the condenser is not able to effectively transfer the heat which affects the cooling capability of the chiller. Typically, chillers need to be cleaned once a year, but this schedule may be different based on the environment and the usage of the chillers.

FIG. 3 illustrates a visualization of an example computing environment for generating predicted service case(s) and predicted maintenance date(s) for an asset using a data model, in accordance with at least some example embodiments of the present disclosure. In this regard, the example computing environments and various data described associated therewith may be maintained by one or more computing devices, such as the predictive maintenance scheduling apparatus 200. The predictive maintenance scheduling apparatus 200, for example, may be specially configured via hardware, software, firmware, and/or a combination thereof, to perform the various data processing and interactions described with respect to FIG. 3 to generate one or more predicted service case(s) and predicted maintenance date(s) from historical sensor data associated with at least an asset of an operational system.

The example computing environment 300 of FIG. 3 comprises one or more data models for generating one or more predicted service case(s) and one or more predicted maintenance date(s) for one or more asset(s). In an example embodiment, a sensor state prediction model 302 uses historical sensor state values associated with the asset(s) to understand the behavior of the asset(s) and predict future sensor state values and future energy usage. In an example embodiment, the sensor state prediction model 302 comprises an artificial intelligence deep learning model, such as one that uses a Many to Many Transformer framework. In one example embodiment, the sensor state prediction model 302 comprises a Temporal Fusion Transformer model, such as is described in Temporal Fusion Transformers for Interpretable Multi-horizon Time Series Forecasting, by Lim et al., Sep. 29, 2020, available at https://arxiv.org/pdf/1912.09363.pdf, the contents of which is incorporated herein in its entirety. A Temporal Fusion Transformer model is an attention based architecture to provide multi-time horizon predictions. The multi head attention block of the Temporal Fusion Transformer model identifies long range patterns from a time series and prioritizes the most relevant patterns. Each attention head has the ability to focus on a different temporal pattern. A Temporal Fusion Transformer model also uses LSTM (Long Short Term Memory networks) blocks to perform sequence to sequence encoder/decoder to understand the shorter patterns, thereby identifying the relationship of the time steps in shorter intervals. Finally, a Temporal Fusion Transformer model also uses Gated Residual Networks blocks to remove unnecessary inputs based on the system model state. Such a Temporal Fusion Transformer model is able to provide quantile forecasts which helps in understanding the uncertainties in the predictions of the future sensor states. This is done by using the quantile loss function of the Temporal Fusion Transformer model that enables calculation of the losses in quantile ranges. The sensor state prediction model 302 is asset-agnostic, as the sensor state prediction model 302 may be used to predict future sensor state values and future energy usage for any asset for which the sensor state prediction model 302 has been trained.

The sensor state prediction model 302 has a training portion 304 and an inference or prediction portion 306. In the example embodiment, three types of data are input to the training portion 304 in order to train the sensor state prediction model 302 to predict future sensor state values and future energy usage: historical sensor states 316, historical time-varying asset-independent variables 318, and categorical features 320. The historical sensor states 316 comprise telemetry data that is collected from various sensors in the asset. The sensor states may have been collected continuously or at particular time intervals (e.g., every 1 minute, 5 minutes, 30 minutes, hourly, and/or the like). The sensor data may be collected from sensors within the asset or system, positioned in the environment of the asset or system, and/or the like. The historical sensor state values may include data collected over any suitable time frame but would typically comprise data collected over a time frame between three months and one year.

In some example embodiments, the historical sensor state data 316 from an HVAC chiller may include historical values for some or all of the following sensor states (and may include others not listed): chilled water flow rate, chilled water return temperature, chilled water supply temperature, cooling water flow rate, cooling water return temperature, cooling water supply temperature, cooling capacity, chiller status, instantaneous power consumption, chilled water supply set point, condenser refrigerant pressure, condenser refrigerant saturation temperature, evaporator refrigerant pressure, evaporator refrigerant saturation temperature, refrigerant level position, total power consumption, and mode of operation. Some or all of these sensor states are conventionally monitored for real-time asset status, performance monitoring, and/or fault/failure reporting and diagnosis.

The historical time-varying asset-independent variables 318 comprise data that varies with time and is independent of the asset (i.e., there is no direct link between the state of the asset and the time-varying asset-independent variables). In some example embodiments, such time-varying asset-independent variables 318 include but are not limited to weather (e.g., temperature, humidity, etc.) and building occupancy.

The historical sensor state data 316 and the historical time-varying asset-independent variables 318 are time-matched. That is, each historical sensor state data value is linked to a historical time-varying asset-independent variable from the same instance of time.

The categorical features 320 are additional features that are not time-varying and are used to understand the system behavior. In some example embodiments, a categorical feature includes but is not limited to geo-location of the asset.

In some embodiments, the historical sensor states 316, historical time-varying asset-independent variables 318, and categorical features 320 are input into the training portion 304 of the sensor state prediction model 302 to train the model to predict future sensor state values and future energy usage for the asset. A product of the model training are trained model weights 322 that are used by the inference or prediction portion 306 of the sensor state prediction model 302. In some embodiments, after an initial training, further historical data may be input to the training portion 304 of the sensor state prediction model 302, periodically or on an on-going basis, to refine and update the model. In some embodiments, historical data from many of the same type of asset, which may all be located in the same facility or across many different facilities, may be combined to train the sensor state prediction model 302.

In some embodiments, future time-varying asset independent variables 324 and future categorical features 326 are input into the inference portion of the sensor state prediction model 302. In some example embodiments, such future time-varying asset independent variables 324 include but are not limited to predicted weather (e.g., temperature, humidity, etc.), predicted building occupancy, and energy optimization schedules. In some example embodiments, such future categorical features 326 may be the same as the categorical features 320 that are used to train the sensor state prediction model 302.

By receiving the future time-varying asset independent variables 324 and future categorical features 326, the inference portion 306 of the sensor state prediction model 302 outputs predicted energy usage 328 and predicted sensor state values 330 over a predefined prediction time frame. In one example embodiment, the prediction time frame is 90 days, but any suitable time frame may be used. The longer the time frame is (i.e., the further into the future the energy usage and sensor state values are predicted), the less accurate the predictions are likely to be.

The predicted energy usage 328 and predicted sensor state values 330 over the prediction time frame are input into a domain based model 308. The domain based model 308 is specific to the asset and/or asset type and is programmed to perform asset-specific calculations. In an example embodiment, the domain based model 308 comprises a future key performance indicator (KPI) calculator 310, an optimum energy usage calculator 312, and a future energy wastage calculator 314. KPIs are asset-specific indicators of performance and are calculated from asset-specific sensor data (which may be current performance based on current sensor data or predicted future performance based on predicted future sensor data).

In an example embodiment, KPIs for a chiller include but are not limited to coefficient of performance (COP), energy efficiency, condenser approach temperature, and evaporator approach temperature. In some embodiments, the coefficient of performance KPI is calculated using the formula: (cooling load)/(instantaneous power consumption), where the cooling load is calculated using the formula: 4.19*(chilled water flow rate)*(chilled water return temperature–chilled water supply temperature). In such an embodiment, instantaneous power consumption, chilled water flow rate, chilled water return temperature, and chilled water supply temperature are all sensor values. Thus, by having future predicted values of instantaneous power consumption, chilled water flow rate, chilled water return temperature, and chilled water supply temperature from the sensor state prediction model 302, the future KPI calculator 310 of the domain based model 308 is able to calculate the future coefficient of performance for the asset.

Similarly, in some embodiments the energy efficiency KPI is calculated using the formula: (instantaneous power consumption)/(cooling load (RT)), where the cooling load (RT) is calculated using the formula: (cooling load)/3.517. Thus, by having future predicted values of instantaneous power consumption, chilled water flow rate, chilled water return temperature, and chilled water supply temperature from the sensor state prediction model 302, the future KPI calculator 310 of the domain based model 308 is able to calculate the future energy efficiency of the asset.

Again, in a similar fashion, in some embodiments the condenser approach temperature KPI is calculated using the formula: (condenser refrigerant saturation temperature)–(cooling water return temperature). Thus, by having future predicted values of condenser refrigerant saturation temperature and cooling water return temperature from the sensor state prediction model 302, the future KPI calculator 310 of the domain based model 308 is able to calculate the future condenser approach temperature of the asset.

Yet again in a similar fashion, in some embodiments the evaporator approach temperature KPI is calculated using the formula: (chilled water supply temperature)–(evaporator refrigerant saturation temperature). Thus, by having future predicted values of chilled water supply temperature and evaporator refrigerant saturation temperature from the sensor state prediction model 302, the future KPI calculator 310 of the domain based model 308 is able to calculate the future evaporator approach temperature of the asset.

The calculated value(s) of one or more of the KPIs may indicate one or more maintenance tasks to be performed, and the timing of the maintenance task(s) can be determined based on the future KPI value(s). In an example embodiment, approach temperature is used to calculate the fouling factor on a condenser. Approach temperature is the smallest difference in temperature between the hot and cold liquid that is in an asset. For a condenser, the condenser approach temperature KPI (for which the formula is provided above) should be within the range of 0-2 degree C. to denote effective heat transfer between the mediums. If the calculated future condenser approach temperature (based on the future predicted sensor state values used in the formula above) goes out of that range, in some embodiments a predicted service case 332 with a predicted maintenance date 334 is created to clean the condenser.

Since many of the predicted KPIs that indicate one or more maintenance tasks to be performed would involve a decrease in energy efficiency (for example, a fouled condenser has less effective heat transfer and therefore uses more energy), many of the predicted maintenance tasks would correspond to an increase in the predicted energy usage 328 of the asset. The predicted higher energy usage may be termed energy wastage.

In an example embodiment, the predicted maintenance date 334 is based at least in part on the predicted energy wastage. In an example embodiment, the optimum energy usage calculator 312 of the domain based model 308 calculates a predicted optimum energy usage over the prediction time frame. In an example embodiment, the predicted optimum energy usage is based on the historical energy usage by the asset. In the simplest case, an average of the historical energy usage by the asset is used as the optimum energy usage. However, the energy usage by the asset can vary significantly over time, due to factors such as the cooling load varying over time. As such, in an example embodiment, the historical energy usage is separated into a number of ranges based on the historical cooling load and the historical energy usage in each range is averaged. In an example embodiment, the historical cooling load and energy usage is separated into four ranges. In such an example, the historical energy usage that occurred when the historical cooling load was between 0% and 25% of the maximum historical cooling load is averaged, the historical energy usage that occurred when the historical cooling load was between 26% and 50% of the maximum historical cooling load is averaged, the historical energy usage that occurred when the historical cooling load was between 51% and 75% of the maximum historical cooling load is averaged, and the historical energy usage that occurred when the historical cooling load was between 76% and 100% of the maximum historical cooling load is averaged. The result is four historical energy usage averages, each corresponding with a different range of cooling load. In such an embodiment, the predicted future cooling load from the sensor state prediction model 302 is compared by the optimum energy usage calculator 312 to determine which range the predicted future cooling load falls into, and the predicted optimum energy usage at that time is the corresponding average historical energy usage for that range.

In some alternative embodiments, the optimum energy usage is based on industry-standard data corresponding to a category of asset to which the asset belongs. Such industry-standard data for HVAC systems is available from the American Society of Heating, Refrigerating and Air-Conditioning Engineers. In some other alternative embodiments, the optimum energy usage is based on asset-specific data from the manufacturer of the asset.

With the predicted optimum energy usage from the optimum energy usage calculator 312 and the predicted energy usage 328 from the sensor state prediction model 302, the future energy wastage calculator 314 can calculate the future energy wastage using the formula: (predicted energy usage)−(predicted optimum energy usage) (in kilowatt hours (kWh)). The result of this calculation is multiplied by the energy cost (e.g., in $/kWh) to calculate the predicted cost of the predicted future energy wastage. In some embodiments, a cumulative value of the predicted future energy wastage will be calculated (e.g., at any point in time during the prediction time frame, what is the cumulative amount of predicted energy wastage up to and including that point in time).

In some embodiments, the predicted maintenance dates 334 are based at least in part on the predicted cost of the future energy wastage. In such example embodiments, the recommended future date for a maintenance task is based at least in part on a date when the calculated energy wastage cumulatively equals a cost of the recommended service task. For example, the cost to clean the condenser may be predetermined to be $500. In such an example, a service task will be created to clean the condenser with a due date corresponding to when the cumulative predicted energy wastage equals or exceeds $500.

In some example embodiments, some or all of the predicted sensor state values, predicted KPIs, and recommended service tasks/dates may be displayed for user(s) in any suitable display format, including but not limited to tabular and/or graphical. FIGS. 4A-E, 5A-C, 6, and 7A-B illustrate example user interfaces associated with a predictive maintenance scheduling system. The example user interfaces of FIGS. 4A-E, 5A-C, 6, and 7A-B may be rendered by one or more computing devices, for example the predictive maintenance scheduling apparatus 200 may cause rendering of the example user interfaces to a display or one or more client device(s) associated with the predictive maintenance scheduling apparatus 200. For example, in some embodiments, the example user interfaces are rendered to a client device associated with a particular user to enable the user to view and/or otherwise interact with the example user interfaces.

Figures 4A, 4B:
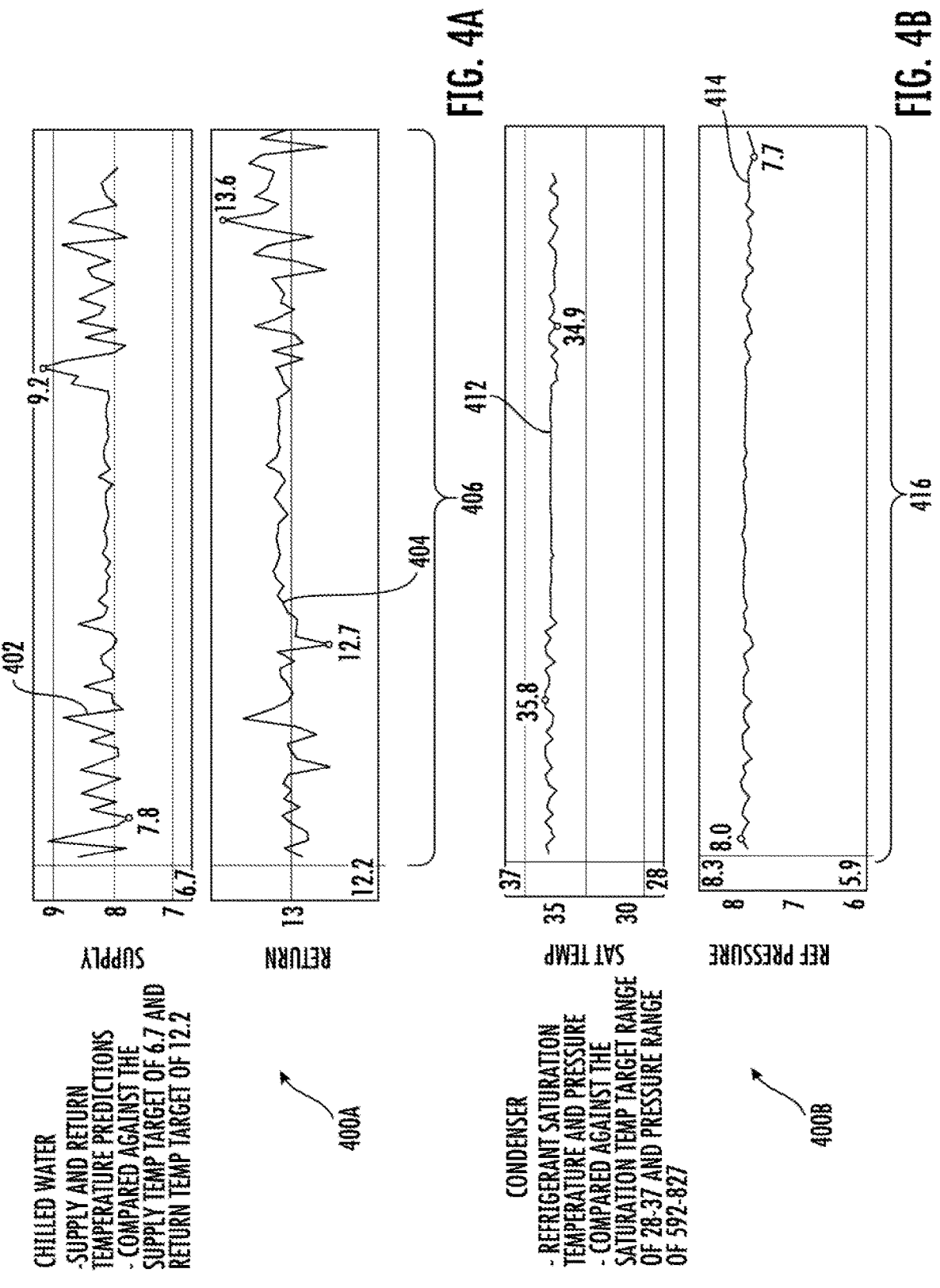
Figures 4C, 4D:
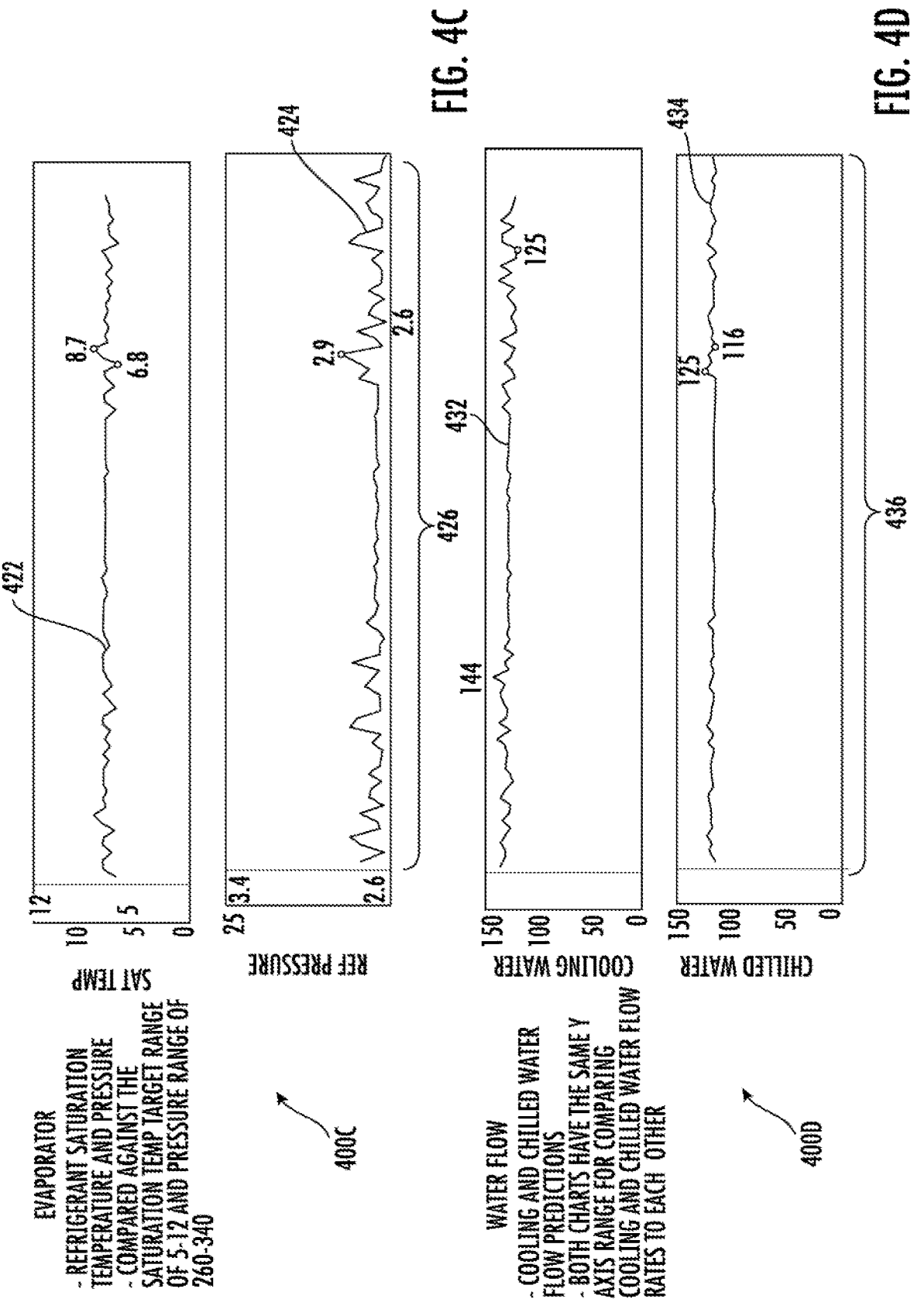
Figure 4E:
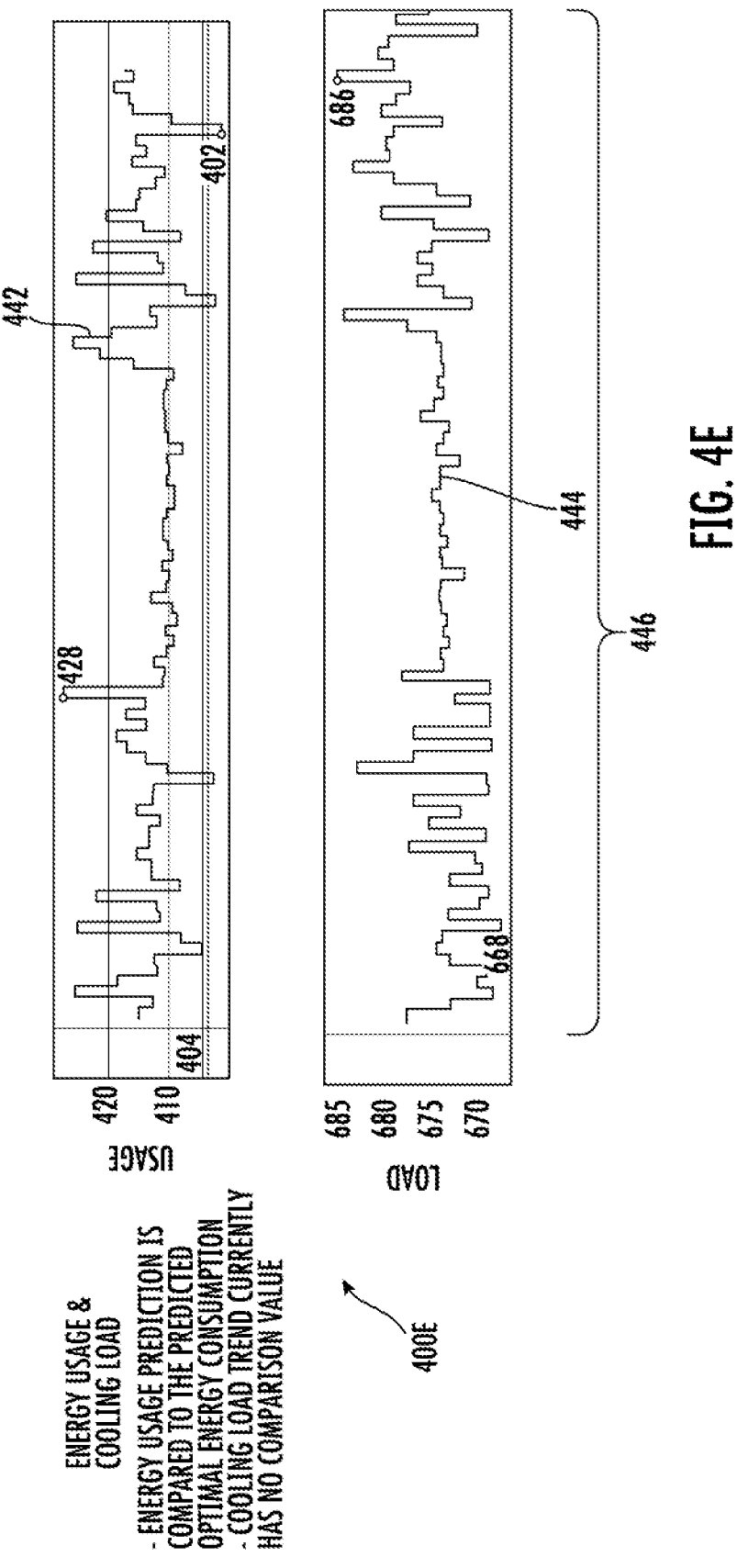

The example user interfaces of FIGS. 4A-E are graphical representations of example predictions of ten different sensor state values for a chiller over the prediction time frame (which is 90 days in one example). The ten sensor state values illustrated in FIGS. 4A-E are selected for illustration purposes; different and/or additional sensor state values may be illustrated in other embodiments. As described above, the predicted sensor state values are used in example embodiments to calculate predicted KPIs over the prediction time frame. FIG. 4A illustrates a user interface 400A showing a predicted chilled water supply temperature 402 and a predicted chilled water return temperature 404 over the prediction time frame 406. FIG. 4B illustrates a user interface 400B showing a predicted condenser refrigerant saturation temperature 412 and a predicted condenser refrigerant pressure 414 over the prediction time frame 416. FIG. 4C illustrates a user interface 400C showing a predicted evaporator refrigerant saturation temperature 422 and a predicted evaporator refrigerant pressure 424 over the prediction time frame 426. FIG. 4D illustrates a user interface 400D showing a predicted cooling water flow rate 432 and a predicted chilled water flow rate 434 over the prediction time frame 436. FIG. 4E illustrates a user interface 400E showing a predicted energy usage 442 and a predicted cooling load 444 over the prediction time frame 446.

The example user interfaces of FIGS. 5A-C are graphical representations of example predictions of three different KPIs for a chiller over the prediction time frame (which is 90 days in one example). The three KPIs illustrated in FIGS. 5A-C are selected for illustration purposes; different and/or additional KPIs may be illustrated in other embodiments. As described above, these predicted KPIs are calculated from predicted sensor state values and are used at least in part to generate a maintenance task, as described above. FIG. 5A illustrates a user interface 500A showing a predicted coefficient of performance (COP) 502 for a chiller over the prediction time frame 506. FIG. 5B illustrates a user interface 500B showing a predicted evaporator approach temperature 512 for a chiller over the prediction time frame 516. FIG. 5C illustrates a user interface 500C showing a predicted condenser approach temperature 622 for a chiller over the prediction time frame 526.

The example user interface of FIG. 6 is a graphical representation of an example prediction of energy wastage for a chiller over the prediction time frame (which is 90 days in one example). As described above, predicted energy wastage is calculated from predicted energy usage and predicted optimum energy usage. FIG. 6 illustrates a user interface 600 showing predicted cumulative energy wastage 602 over the prediction time frame 606. As described above, a recommended future date for a maintenance task is based at least in part on a date when the calculated energy wastage cumulatively equals a cost of the recommended service task. FIG. 6 illustrates a date 604 where the cumulative energy wastage ($511 in the example embodiment) exceeds the cost of the recommended service task ($500 in the example embodiment). This date 604 is the point in time at which the service task is recommended to be performed, in this example embodiment.

The example user interface of FIGS. 7A-B are graphical representations of example predicted maintenance tasks and associated timing that are generated in some example embodiments. FIG. 7A illustrates a user interface 700A showing maintenance task recommended timing for a plurality of assets (eight different chillers in the example embodiment) such as might be generated using the predictive maintenance scheduling system described herein. The user interface 700A shows, for each asset 702, a corresponding recommended maintenance date 704 (if any) and a bar graph 706 showing how many days until the recommended maintenance date (the bar graph 706 shows a negative value if the recommended maintenance date has already passed). In an example embodiment, a user might select an asset (e.g., Chiller 2) from the user interface 700A and bring up the user interface 700B shown in FIG. 7B. The user interface 700B shows the recommended task 708 ("Clean evaporator"), along with the same date 710 and bar graph 712 as in FIG. 7A.

Having described example systems, apparatuses, computing environments, and user interfaces associated with embodiments of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternative, any of the processes may include some or all of the steps described and/or depicted, including one or more optional operational blocks in some embodiments. In regards to the below flowcharts, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 8 illustrates a flowchart including operational blocks of an example process for predictive maintenance scheduling, in accordance with at least some example embodiments of the present disclosure. Specifically, FIG. 8 depicts operations of an example process 800. In some embodiments, the computer-implemented process 800 is embodied by computer program code stored on a non-transitory computer-readable medium of a computer program product configured for execution to perform the computer-implemented method. Alternatively or additionally, in some embodiments, the example process 800 is performed by one or more specially configured computing devices, such as the predictive maintenance scheduling system 102 embodied by the specially configured predictive maintenance scheduling apparatus 200. In this regard, in some such embodiments, the predictive maintenance scheduling apparatus 200 is specially configured by computer program instructions stored thereon, for example in the memory 204 and/or another component depicted and/or described herein, and/or otherwise accessible to the predictive maintenance scheduling apparatus 200, for performing the operations as depicted and described with respect to the example process 800. In some embodiments, the specially configured predictive maintenance scheduling apparatus 200 includes and/or otherwise is in communication with one or more external apparatuses, systems, devices, and/or the like, to perform one or more of the operations as depicted and described.

The process 800 begins at step/operation 802. At step/operation 804, a processor (such as, but not limited to, the processor 202 of the predictive maintenance scheduling apparatus 200 described above in connection with FIG. 2) inputs historical time-varying sensor state values associated with an asset into a data model to train the data model. As described above, the data model may use a Many to Many Transformer framework and may comprise a Temporal Fusion Transformer model. In some embodiments, the processor may input the sensor state values from more than one asset, located in more than one facility. As described above, the processor may input historical time-varying sensor state values over any suitable time frame but typically over a time frame between three months and one year.

At step/operation 806, a processor (such as, but not limited to, the processor 202 of the predictive maintenance scheduling apparatus 200 described above in connection with FIG. 2) inputs expected future time-varying asset-independent data over a prediction time frame into the data model. In some embodiments, the future time-varying asset-independent data comprises predicted future weather and predicted future occupancy. In some embodiments, the prediction time frame is 90 days.

At step/operation 808, a processor (such as, but not limited to, the processor 202 of the predictive maintenance scheduling apparatus 200 described above in connection with FIG. 2) generates from the data model predicted sensor state values associated with the asset over the prediction time frame.

At step/operation 810, a processor (such as, but not limited to, the processor 202 of the predictive maintenance scheduling apparatus 200 described above in connection with FIG. 2) generates from the data model predicted energy usage by the asset over the prediction time frame.

At step/operation 812, a processor (such as, but not limited to, the processor 202 of the predictive maintenance scheduling apparatus 200 described above in connection with FIG. 2) determines optimum energy usage by the asset over the prediction time frame. As described above, the optimum energy usage may be determined based on historical energy usage.

At step/operation 814, a processor (such as, but not limited to, the processor 202 of the predictive maintenance scheduling apparatus 200 described above in connection with FIG. 2) calculates energy wastage over the prediction time frame based on a difference between the predicted energy usage and the optimum energy usage of the asset over the prediction time frame.

At step/operation 816, a processor (such as, but not limited to, the processor 202 of the predictive maintenance scheduling apparatus 200 described above in connection with FIG. 2), using the predicted sensor state values, calculates one or more asset performance metrics (termed key performance indicators herein) corresponding to one or more preventive maintenance tasks.

At step/operation 818, a processor (such as, but not limited to, the processor 202 of the predictive maintenance scheduling apparatus 200 described above in connection with FIG. 2), generates one or more recommended service tasks over the prediction time frame based at least in part on the one or more calculated performance metrics and at least in part on the calculated energy wastage over the prediction time frame. As described above, the processor may generate one or more recommended service tasks over the prediction time frame based at least in part on a date when the calculated energy wastage cumulatively equals a cost of the one or more recommended service task.

At step/operation 820, a processor (such as, but not limited to, the processor 202 of the predictive maintenance scheduling apparatus 200 described above in connection with FIG. 2), reports the one or more recommended service tasks to a user, such as via the input/output circuitry 206 of the predictive maintenance scheduling apparatus 200 described above in connection with FIG. 2. In some embodiments, the recommended service tasks are reported to a user in the form of the user interface 700A.

The process 800 ends at step/operation 822.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks.

However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:

at a device with one or more processors and one or more memories:

inputting historical time-varying sensor state values from one or more sensors associated with an asset along with historical time-varying asset-independent data and categorical features associated with the asset into a data model to train the data model, wherein the historical time-varying sensor state values and the historical time-varying asset-independent data are time-matched to train the data model;

training the data model using the historical time-varying sensor state values, the historical time-varying asset-independent data, and the categorical features to derive one or more trained model weights;

retraining the trained data model based on the one or more trained model weights using historical data associated with at least one asset similar to the asset, wherein the trained data model is deployed on a cloud, and wherein at least one operation of the asset and the one or more sensors is controlled by at least one respective controller associated with the asset;

identifying at least one of an upstream asset and a downstream asset associated with the asset, wherein the asset is tagged with one or more data values that indicate association between the asset and the at least one of the upstream asset and the downstream asset, and wherein a failure associated with the asset affects the at least one of the upstream asset and the downstream asset;

inputting expected future time-varying asset-independent data over a time frame and the one or more data values into the trained data model;

generating from the trained data model predicted sensor state values associated with the asset over the time frame;

generating from the trained data model predicted energy usage by the asset over the time frame;

determining optimum energy usage by the asset over the time frame;

calculating energy wastage over the time frame based on a difference between the predicted energy usage and the optimum energy usage of the asset over the time frame;

calculating, using the predicted sensor state values, one or more asset performance metrics corresponding to one or more preventive maintenance tasks;

generating one or more recommended service tasks over the time frame based at least in part on the one or more calculated performance metrics and at least in part on the calculated energy wastage over the time frame;

automatically controlling, based on the generated recommended service tasks, operation of the asset via the at least one respective controller associated with the asset by adjusting at least one of: a mode of operation, a chilled water supply set point, activation or manipulation of an actuator of the asset to reduce predicted energy usage until the recommended service task is performed; and responsive to the controlling operation of the asset and based at least in part on the generated recommended service tasks, automatically rendering a user interface to display the one or more recommended service tasks for the asset along with an associated timing for performing the recommended service tasks and a bar graph showing remaining days until each service task of recommended service tasks is due.

2. The method of claim 1, wherein the optimum energy usage by the asset over the time frame is determined based on historical energy usage by the asset.

3. The method of claim 1, wherein the optimum energy usage by the asset over the time frame is determined based on industry-standard data corresponding to a category of asset to which the asset belongs.

4. The method of claim 1, wherein the recommended service tasks are based at least in part on a date when the calculated energy wastage cumulatively equals a cost of the one or more recommended service tasks.

5. The method of claim 1, wherein the data model comprises a temporal fusion transformer deep learning model.

6. The method of claim 1, wherein the future time-varying asset-independent data comprises at least forecasted weather and occupancy data.

7. An apparatus comprising at least one processor and at least one non-transitory memory comprising program code, wherein the at least one non-transitory memory and the program code are configured to, with the at least one processor, cause the apparatus to at least:

input historical time-varying sensor state values from one or more sensors associated with an asset along with historical time-varying asset-independent data and categorical features associated with the asset into a data model to train the data model, wherein the historical time-varying sensor state values and the historical time-varying asset-independent data are time-matched to train the data model;

train the data model using the historical time-varying sensor state values, the historical time-varying asset-independent data, and the categorical features to derive one or more trained model weights;

retrain the trained data model based on the one or more trained model weights using historical data associated with at least one asset similar to the asset, wherein the trained data model is deployed on a cloud, and wherein at least one operation of the asset and the one or more sensors is controlled by at least one respective controller associated with the asset;

identify at least one of an upstream asset and a downstream asset associated with the asset, wherein the asset is tagged with one or more data values that indicate association between the asset and the at least one of the upstream asset and the downstream asset, and wherein a failure associated with the asset affects the at least one of the upstream asset and the downstream asset;

input expected future time-varying asset-independent data over a time frame and the one or more data values into the trained data model;

generate from the trained data model predicted sensor state values associated with the asset over the time frame;

generate from the trained data model predicted energy usage by the asset over the time frame;

determine optimum energy usage by the asset over the time frame;

calculate energy wastage over the time frame based on a difference between the predicted energy usage and the optimum energy usage of the asset over the time frame;

calculate, using the predicted sensor state values, one or more asset performance metrics corresponding to one or more preventive maintenance tasks;

generate one or more recommended service tasks over the time frame based at least in part on the one or more calculated performance metrics and at least in part on the calculated energy wastage over the time frame;

automatically control, based on the generated recommended service tasks, operation of the asset via the at least one respective controller associated with the asset by adjusting at least one of: a mode of operation, a chilled water supply set point, activation or manipulation of an actuator of the asset to reduce predicted energy usage until the recommended service task is performed; and responsive to the controlling operation of the asset and based at least in part on the generated recommended service tasks, automatically render a user interface to display the one or more recommended service tasks for the asset along with an associated timing for performing the recommended service tasks and a bar graph showing remaining days until each service task of recommended service tasks is due.

8. The apparatus of claim 7, wherein the optimum energy usage by the asset over the time frame is determined based on historical energy usage by the asset.

9. The apparatus of claim 7, wherein the optimum energy usage by the asset over the time frame is determined based on industry-standard data corresponding to a category of asset to which the asset belongs.

10. The apparatus of claim 7, wherein the recommended service tasks are based at least in part on a date when the calculated energy wastage cumulatively equals a cost of the one or more recommended service task.

11. The apparatus of claim 7, wherein the data model comprises a temporal fusion transformer deep learning model.

12. The apparatus of claim 7, wherein the future time-varying asset-independent data comprises at least forecasted weather and occupancy data.

13. A computer program product comprising at least one non-transitory computer-readable storage medium having computer-readable program code portions stored therein, the computer-readable program code portions comprising an executable portion configured to:

input historical time-varying sensor state values from one or more sensors associated with an asset along with historical time-varying asset-independent data and categorical features associated with the asset into a data model to train the data model, wherein the historical time-varying sensor state values and the historical time-varying asset-independent data are time-matched to train the data model;

train the data model using the historical time-varying sensor state values, the historical time-varying asset-independent data, and the categorical features to derive one or more trained model weights;

retrain the trained data model based on the one or more trained model weights using historical data associated with at least one asset similar to the asset, wherein the trained data model is deployed on a cloud, and wherein at least one operation of the asset and the one or more sensors is controlled by at least one respective controller associated with the asset;

identify at least one of an upstream asset and a downstream asset associated with the asset, wherein the asset is tagged with one or more data values that indicate association between the asset and the at least one of the upstream asset and the downstream asset, and wherein a failure associated with the asset affects the at least one of the upstream asset and the downstream asset;

input expected future time-varying asset-independent data over a time frame and the one or more data values into the trained data model;

generate from the trained data model predicted sensor state values associated with the asset over the time frame;

generate from the trained data model predicted energy usage by the asset over the time frame;

determine optimum energy usage by the asset over the time frame;

calculate energy wastage over the time frame based on a difference between the predicted energy usage and the optimum energy usage of the asset over the time frame;

calculate, using the predicted sensor state values, one or more asset performance metrics corresponding to one or more preventive maintenance tasks;

generate one or more recommended service tasks over the time frame based at least in part on the one or more calculated performance metrics and at least in part on the calculated energy wastage over the time frame;

automatically control, based on the generated recommended service tasks, operation of the asset via the at least one respective controller associated with the asset by adjusting at least one of a mode of operation, a chilled water supply set point, activation or manipulation of an actuator of the asset to reduce predicted energy usage until the recommended service task is performed; and responsive to the controlling operation of the asset and based at least in part on the generated recommended service tasks, automatically render a user interface to display the one or more recommended service tasks for the asset along with an associated timing for performing the recommended service tasks and a bar graph showing remaining days until each service task of recommended service tasks is due.

14. The computer program product of claim 13, wherein the optimum energy usage by the asset over the time frame is determined based on historical energy usage by the asset.

15. The computer program product of claim 13, wherein the optimum energy usage by the asset over the time frame is determined based on industry-standard data corresponding to a category of asset to which the asset belongs.

16. The computer program product of claim 13, wherein the recommended service tasks are based at least in part on a date when the calculated energy wastage cumulatively equals a cost of the one or more recommended service task.

17. The computer program product of claim 13, wherein the data model comprises a temporal fusion transformer deep learning model.

* * * * *